United States Patent [19]

Webber et al.

[11] Patent Number: 5,044,500
[45] Date of Patent: Sep. 3, 1991

[54] PACKAGE FOR HANDLING AND TRANSPORTING GLASS SLIDES

[75] Inventors: Peter J. Webber; Philip L. J. Webber, both of Hertfordshire, England

[73] Assignees: Erie Scientific Company, Portmouth, N.H.; Histolab, Ltd., Herts, United Kingdom

[21] Appl. No.: 402,000

[22] Filed: Sep. 1, 1989

[51] Int. Cl.⁵ .............................................. B65D 1/36
[52] U.S. Cl. ................................... 206/456; 206/455; 220/345; 220/346; 220/347
[58] Field of Search .............. 206/232, 455, 456, 804, 206/270; 220/345, 346, 347; 229/92

[56] References Cited

U.S. PATENT DOCUMENTS

| | | | |
|---|---|---|---|
| 2,292,279 | 8/1942 | Marton | 206/1 |
| 2,378,003 | 6/1945 | Duell | 220/345 |
| 2,777,570 | 1/1957 | Mytinger | 220/345 |
| 2,848,106 | 8/1958 | Rice | 220/345 |
| 3,278,009 | 10/1966 | Crump, Jr. | 220/345 |
| 3,362,564 | 1/1968 | Mueller | 220/346 |
| 3,463,301 | 8/1969 | Speelman | 206/456 |
| 3,756,393 | 9/1873 | Markwitz et al. | 206/456 |
| 3,923,152 | 12/1975 | Minneman | 206/804 |
| 4,016,972 | 4/1977 | Szamborski | 206/407 |
| 4,201,332 | 5/1980 | Wooten | 229/92 |
| 4,436,202 | 3/1984 | Berkley | 206/455 |
| 4,589,551 | 5/1986 | Hellon | 206/456 |
| 4,711,348 | 12/1987 | Schluger | 206/232 |
| 4,771,934 | 9/1988 | Kalmanides | 206/407 |
| 4,776,462 | 10/1988 | Kosugi | 206/334 |
| 4,828,111 | 5/1989 | Rosenberg | 206/456 |

*Primary Examiner*—David T. Fidei
*Attorney, Agent, or Firm*—Marjama & Pincelli

[57] ABSTRACT

A container for handling and transporting glass slides. The container comprise a base support having at least one slide retention well for receiving a single glass slide and a cover for engagement with the base support. A projection is provided on the cover for alternating access to different portions of the slide as desired.

31 Claims, 7 Drawing Sheets

PACKAGE FOR HANDLING AND TRANSPORTING GLASS SLIDES

The present invention is directed to a package for handling and transporting glass slides, and more particularly, to a package for handling and transporting microscope glass slides.

BACKGROUND OF THE INVENTION

In the normal practice of medicine it is often necessary for the physician to obtain a detailed analysis of biological samples in various medical fields such as histology, cytology, microbiology, hematology, etc. Many of these analyses require highly specialized and trained technicians and specialized equipment, not typically available to the physician. Therefore, the physician obtains a biological sample and forwards it to a lab for analysis. Various kits and containers have been used in the prior art for transporting these slides. In one prior art kit slides are provided to the doctor along with appropriate shipping containers and labels for forwarding the specimens to the laboratory for analysis. The shipping container simply comprises a generally rectangular box in which slide is placed. The slide is allowed to freely move within the container. The slides may be provided with the kit or taken from a box of slides. In many instances, these slides have been exposed to the environment, and thus, are often coated with dust. Additionally, these slides must be handled by the physician with his or her fingers, resulting in natural grease from the hand being transferred to the slide. In many of the tests to be conducted, it is extremely important that the specimens be as clean as possible. Thus, it is important to avoid any unnecessary contact with the slide during transportation or handling by the physician.

Applicants have invented an improved package for handling and transporting glass slides which minimizes or overcomes many of the problems of prior art.

SUMMARY OF THE INVENTION

In one aspect of the present invention there is provided a container for handling and transporting glass slides. The container comprise a base support having at least one slide retention well for receiving a single glass slide and a cover for engagement with the base support. A projection is provided on the cover for allowing alternating access to different portions of the slide as desired.

In another aspect of the present invention there is provided a kit for handling and transporting microscope slides. The kit included at least one microscope slide, a container for holding and marking the slide and an information mailing label secured to the container.

BRIEF DESCRIPTION OF THE DRAWINGS

FIG. 10a is a cross-sectional view of the container of FIG. 10 taken along line 10a—10a;

FIG. 11 is a view similar to FIG. 2 showing the cover in a second open position wherein the specimen is placed on the slide;

FIG. 11a is a cross-sectional view of the container of FIG. 11 taken along line 11a—11a;

FIG. 18a is a cross-sectional view of the base support of FIG. 18 taken along lines 18a—18a.

DETAILED DESCRIPTION OF THE PRESENT INVENTION

Referring to FIGS. 1-11, there is illustrated a container 10, made in accordance with the present invention which comprises the base support 12 and a cover 14. The base support 12 and cover 14 are preferably made of a plastic material and in the particular embodiment illustrated, base support 12 and cover 14 are molded out of polypropylene. However, it is to be understood that the base support 12 and cover 14 may be made of any other suitable plastic or other material.

Figure 1:
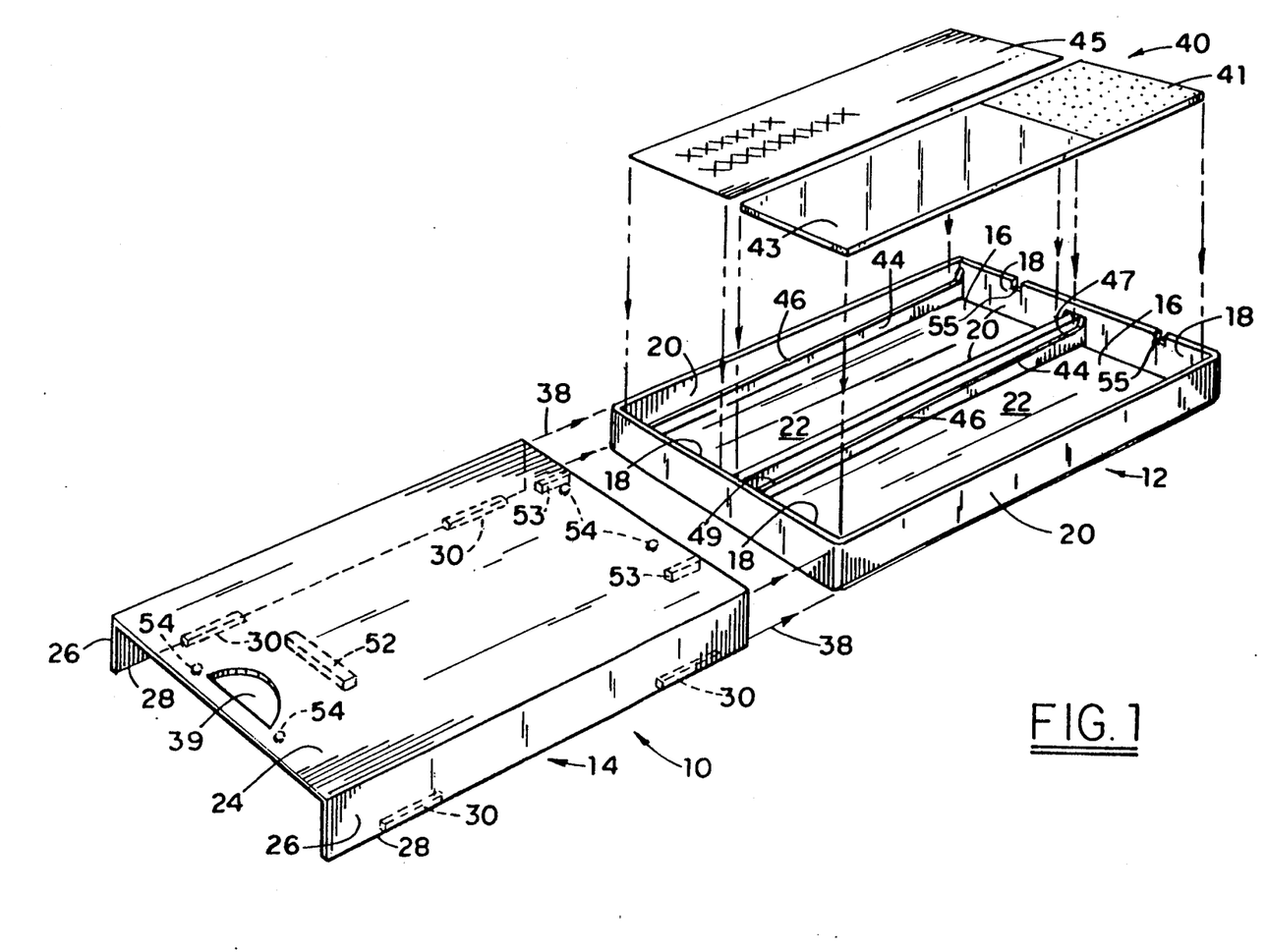
FIG. 1 is an exploded view of a package made in accordance with the present invention for holding and transporting glass slides.

The base support 12 is provided with two slide retention wells 16. In the preferred embodiment, as illustrated, the slide retention wells 16 are formed as an integral part of the base support 12 during molding. Each slide retention well 16 includes a pair of end walls 18, a pair of side walls 20, and a bottom surface 22.

The cover 14 comprises a generally cross-sectional U-shape configuration having a top portion 24 designed to slide on base support 12. Cover 14 further includes a pair of oppositely disposed downwardly extending side walls 26 designed to be adjacent the outside surface of side walls 20 of base support 12. Sidewalls 26 each terminate in a rim 28 adjacent bottom surface 22. A pair of lugs 30 are provided adjacent each rim 28 and are designed such that when the cover 14 is placed on base support 12, the cover 14 snaps fit over base support 12. The lugs 30 are space axially apart so they provide stability of the cover 14 base support when the cover is in various open positions as is discussed later herein. The lugs 30 slide in a mating groove 29 formed along the length of bottom wall 22 of the adjacent slide retention well 16, allowing the cover to freely slide in the axial directions indicated by arrows 38. A finger tip recess 39 is provided at one end of the top portion 24 for receiving the tip of a finger to assist in sliding cover 24 along it's long axis.

The base support 12 is designed to receive a glass slide 40 placed in each slide retention well 16. The slide 40 is typical of slides available in the prior art. In the particular embodiment illustrated, slide 40 has a marking surface 41 disposed at one end. The marking surface 41 can be of any particular type that is conventional and found in slides of the prior art, for example, the mark surface may be etched, sand blasted, or provided by a layer of a resinous material. The remaining portion of the slide 40 comprises a specimen retention area 43 upon which a smear specimen is provided by the physician. The side walls 20 and end walls 18 of each slide retention well 16 are respectively sized such that a slide 40 can easily fit therein, leaving only a small clearance between the slide 40 and adjacent walls.

Figure 18:
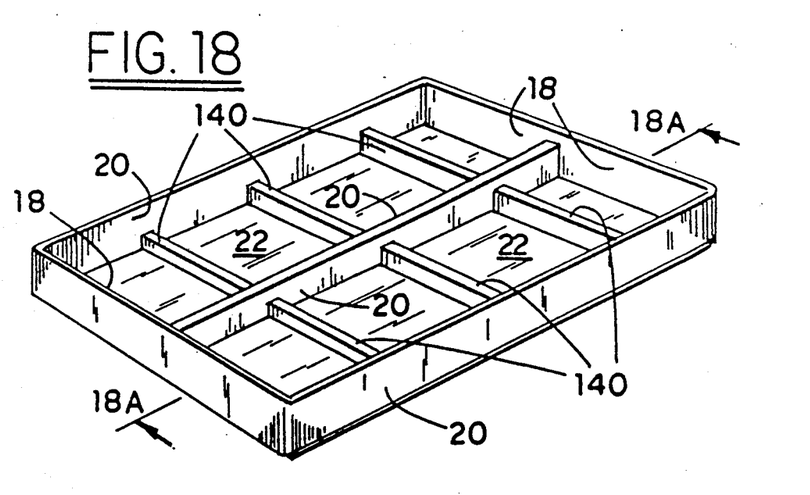
FIG. 18 is a perspective view of a modified base support made in accordance with the present invention.
Figure 18A:
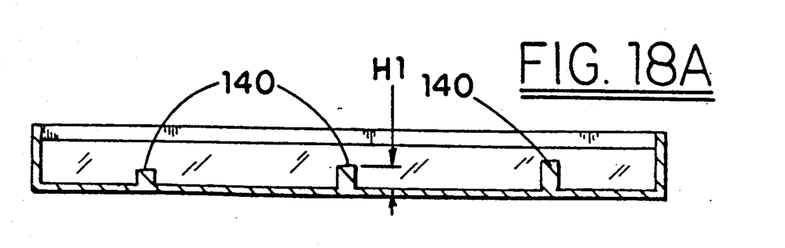

Means are provided in base support 12 for supporting the slide within the retention well 16 such that the slide is disposed at a small angle with regard to the top portion 24 of cover 14. In the particular embodiment illustrated this is provided by a pair of supporting ramps 44 integrally formed in each side wall 20. Each ramp 44 has a top surface 46, upon which the glass slide 40 rests. As can be seen, top surface 46 is a substantially flat surface disposed at an angle $\alpha$ with respect to the bottom surface 22 (see FIG. 4). In the preferred embodiment illustrated, the ramp 46 is continuous along the length of side walls 20, however, all that is necessary is that sufficient support is provided within the well 16 to maintain the slide 40 at this relatively low angle. Angle $\alpha$ may be any low angle desired, preferably from about 0°–6°. In the particular embodiment illustrated, $\alpha$ is about 2°. In the preferred embodiment illustrated, the lower end 47 of ramp 46 is spaced from bottom wall 22 and the upper end 49 is spaced below the top edge of end wall 18 so that when a slide is placed therein, a small space is provided between the top of slide 40 and the bottom of cover 14. Various other configurations of ramp 46 may be selected as desired. Additionally, various other means for supporting slide 40 may be provided within the retention well 16 at angle $\alpha$. For example, referring to FIGS. 18 and 18a, there is illustrated a modified base support 12 wherein alternate means for support slide 40 is provided. This embodiment is similar to that illustrated in FIG. 1, like numerals indicating like parts, except in place of the ramps 44 there is provided a plurality of axially spaced support piers which progressively change in height H from one end to the other.

Referring back to FIGS. 1-11, the slide retention well 16 closest to the front, is provided with a glass slide 40, however, the second receiving well 16, furthest from the viewer is provided with an advertising sheet 45 which can provide any desired appropriate identification or advertisement as desired. Alternatively, a second microscope slide can be placed in the second retention well 16. It is to be understood that any desired number of retention wells 16 may be provided in the base support 12.

Figure 10:
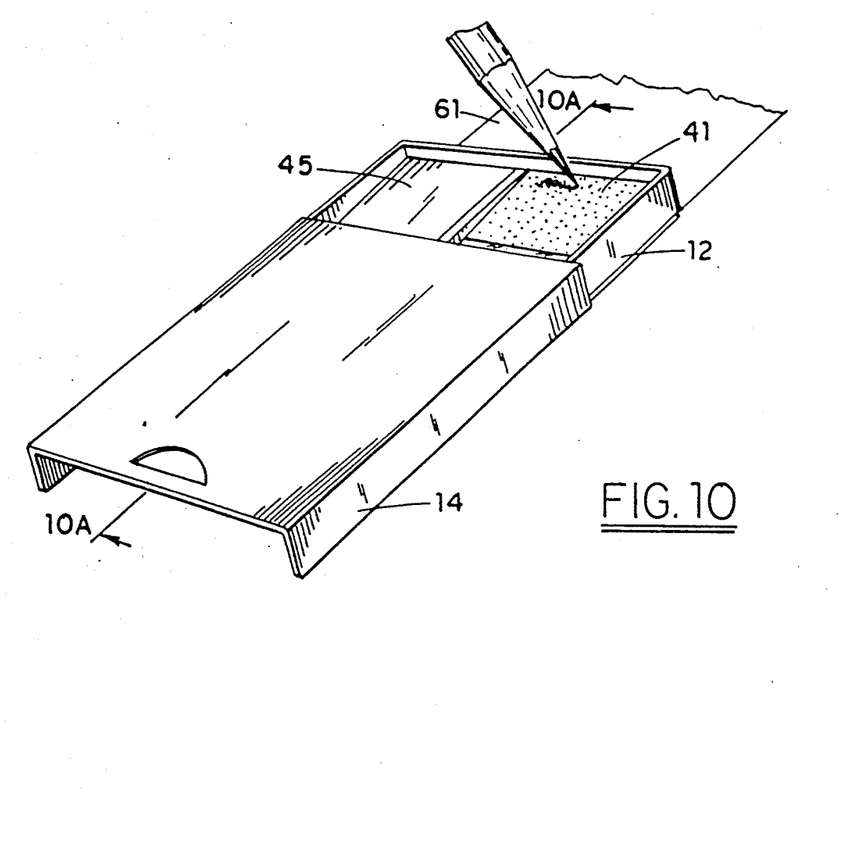
FIG. 10 is a view similar to FIG. 2 illustrating the cover in a first open position.
Figure 10A:
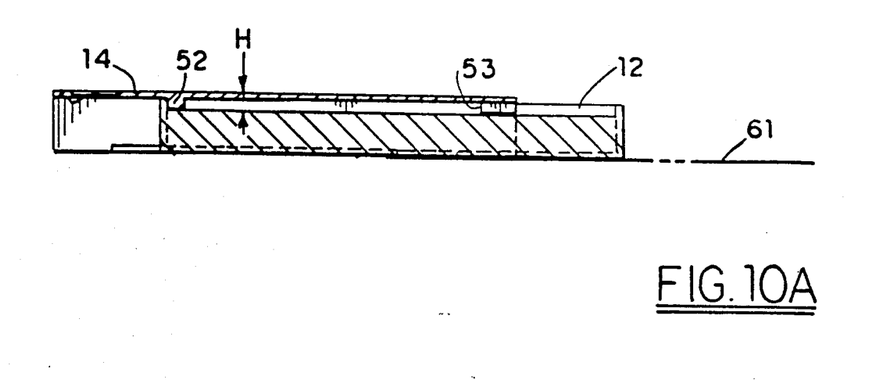

The cover 14 is provided with means for allowing alternate access to either the marking portion 41 or the specimen retention area 45 of slide 40. In the particular embodiment illustrated, this is accomplished by providing a bar stop 52 integrally formed on the bottom surface of cover 14. Bar stop 52 has a height H sufficient such that it will stop against the inside surface of end wall 18 when the cover is slid in either axial direction. In the particular embodiment illustrated, height H is about 0.037"(0.94 mm). Referring to FIG. 10, there is illustrated the cover 14 slid in its furthest left side position. Stop 52 prevents any further sliding of the cover 14 in the direction toward the left. The location of stop 52 is preferably located as illustrated so that substantially only the marking portion 41 of slide 40 is visible when the cover is in this first open position. The cover 14 in this position, allows the physician to provide any appropriate information directly on the slide as desired. Additionally, since the cover is preventive from any further axial movement, there is substantially no chance that any inadvertent contact with the specimen support area 43.

Figures 11, 11A:
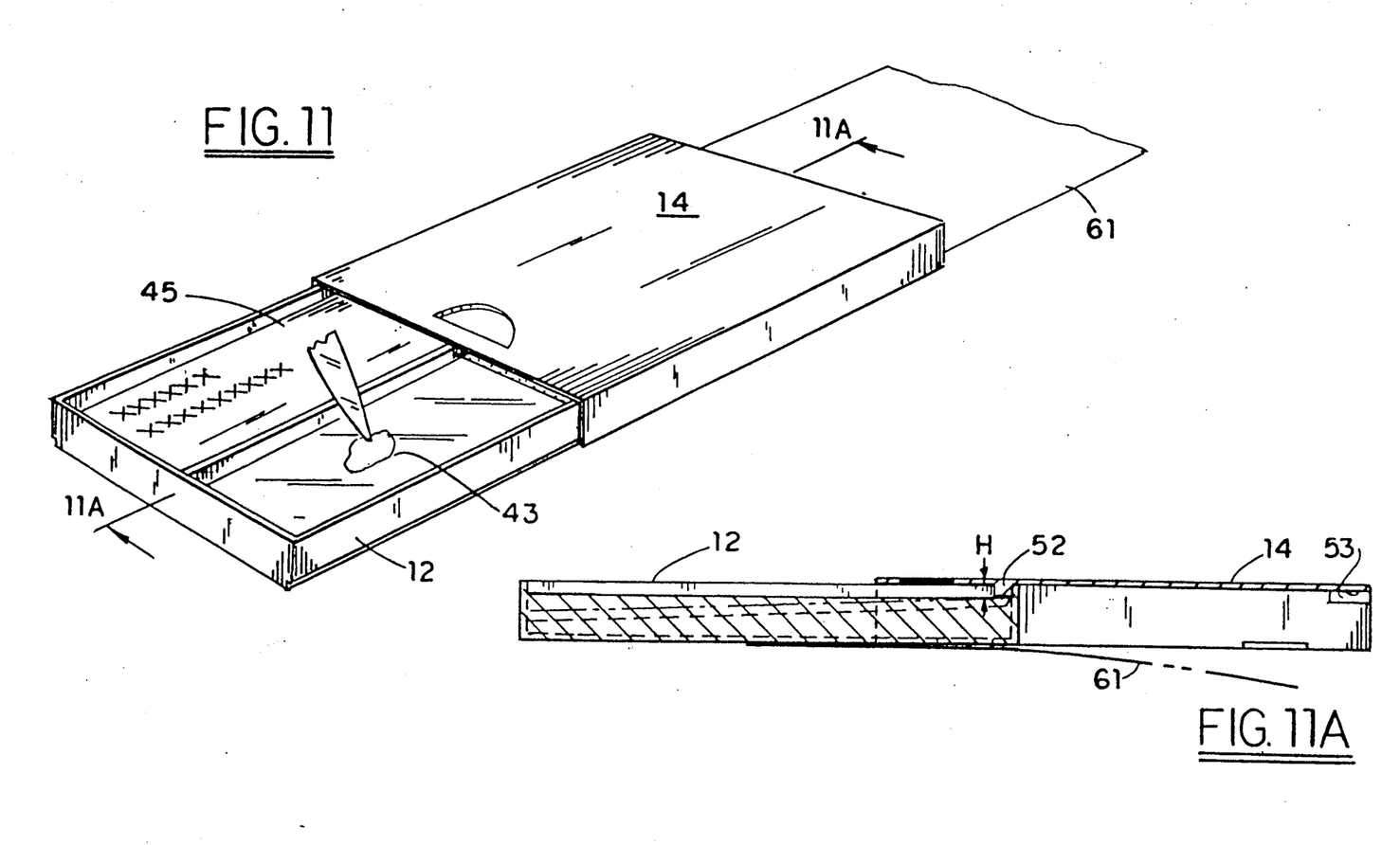

Referring to FIG. 11, there is illustrated the cover 14 in the second open position which allows access to the specimen retention area 43. The cover 14 is simply slid to the right wherein until the bar stop 52 is adjacent end wall 18. When the cover is in this position, the physician simply places the appropriate specimen thereon as is customary in the art. Also, when the cover is in this position the bar stop 52 is preferably designed to press slightly against the top surface of slide 40. This prevents any unnecessary movement of the slide as the physician is applying the specimen to the slide 40. Additionally, as can be seen, there is substantially no chance of causing any inadvertent mark to the information placed on marking surface 41. In the preferred embodiment illustrated, the cover 14 is made out of a plastic material that is transparent or translucent material to allow the physician to view any information placed on the marking surface 41 as the specimen is smeared on to the specimen retention area 43.

Figure 7:
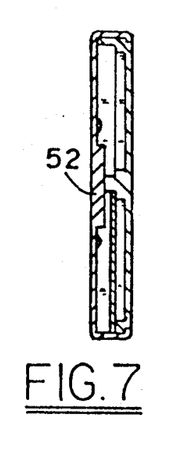
FIG. 7 is a cross-sectional view of the container of FIG. 2 taken along line 7—7.
Figure 8:
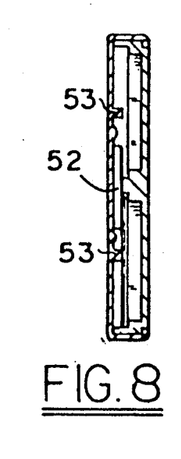
FIG. 8 is a cross-sectional view of the container of FIG. 2 taken along line 8—8.
Figure 9:
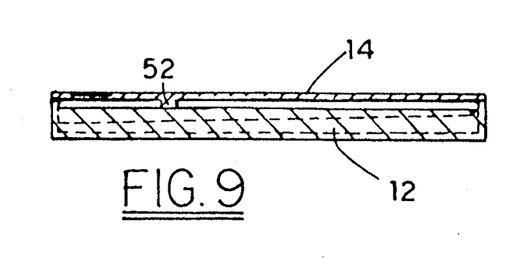
FIG. 9 is a cross-sectional view of the container of FIG. 2 taken along line 9—9.

When the physician is done, the cover 14 is slid into the closed position illustrated in FIG. 7. In the preferred embodiment illustrated, top cover 14 is provided with a pair of projections 53 which extend toward base support 12, one projection being associated with each slide retention well 16 adjacent the end 18 of the slide 40 close to top cover 14. The projection is designed to pass through an axially aligned opening 55 in base support 12 having a mating configuration which allows projection 53 to easily pass therethrough leaving only a small clearance space therebetween. The projection 53 is designed to extend slightly past the end of slide 40 as illustrated in FIG. 8. In embodiments illustrated, projection 53 extends about 0.25 inches (6.35 mm) along the length of slide 40 and has a width of about 0.125 inches (3.75 mm). It is to be understood that length and width may be varied as desired. The bottom surface of projection 53 is designed to be slightly above the slide 40 when in the closed position so as to minimize or prevent the slide from moving during transportation and contacting the cover 14. Since the slide is at a small angle, when the slide is slid in the first open position illustrated in FIG. 10, projection 53 moves away from the top surface of slide 40. Aligned opening 55 allows the projection 53 to extend past end 18 when the cover 14 is placed in the second open position illustrated in FIG. 11. Preferably, as illustrated, the outer end 59 of projection 53 is substantially flush with the outer surface of end wall 18 so as to minimize any potential contamination from entering the container.

The bar stop 52, as illustrated in FIG. 7 extends only a short distance across the width of slide 40. Bar stop 52 also serves to prevent the top of slide 40 from fully contacting the cover 14. The short length minimizes the potential contact of bar stop 52 with a specimen placed on the side. In the embodiment illustrated, bar stop 52 extends across slide 40 a distance of about 0.125 inches (3.75 mm). The cover 14 is also provided with projections 54 on the underside of top portion 22 which are designed to engage the inside of end walls 18 so as to provide a stop position when the cover 14 is slid along the base support 12. The height of projections 54 is such that it provides a stop point, but is sufficiently small such that it can be easily overcome by the simple further exertion of pressure along the direction indicated by arrow 38. In the embodiment illustrated, each projection 54 has a height of about 0.010 inches (0.254 mm). In the preferred embodiment illustrated, additional projections 57 are integrally formed on the top of center side wall 20 and disposed adjacent both sides of bar stop 52. These projections 57 operate in a similar manner as projections 54. When the cover is in the closed position, projections 57 assist to maintain cover 14 in the closed position. However, only as relatively small force is necessary to move cover 14 over projections 57. In the embodiment illustrated, projections 57 have a height of about 0.010 inches (0.254 mm), while in the preferred embodiment illustrated, projections 57 and 54 are used to maintain cover 14 in the closed position. Projections 57 or 54 may be omitted as desired.

Figure 2:
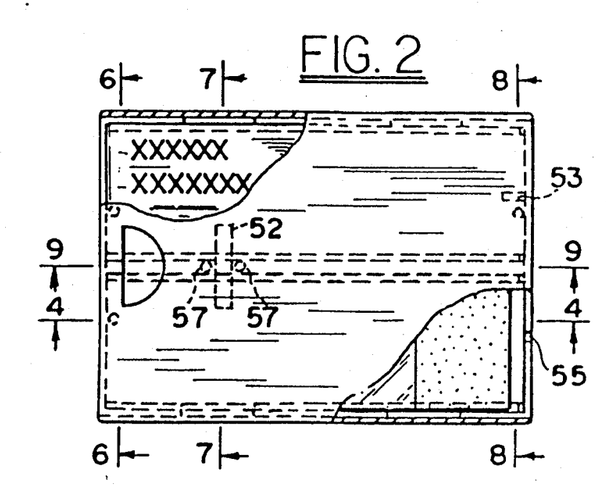
FIG. 2 is a top plan view of the container of FIG. 1 in the closed position partially broken away to illustrate a glass slide placed therein.
Figure 3:
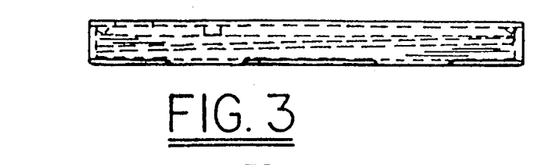
FIG. 3 is a front elevational view of the container of FIG. 2.
Figure 4:
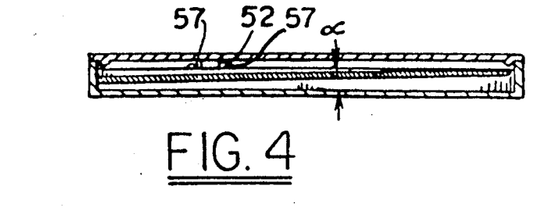
FIG. 4 is a cross-sectional view of container 2 taken along the line 4—4 of FIG. 2.
Figure 5:
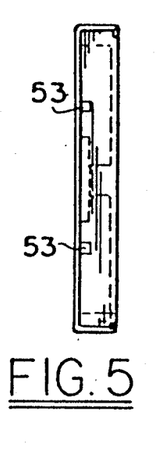
FIG. 5 is an end elevational view of the container of FIG. 2.
Figure 6:
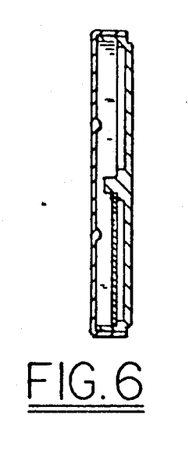
FIG. 6 is a cross-sectional view of the container of FIG. 2 taken along line FIG. 6—6.
Figure 12:
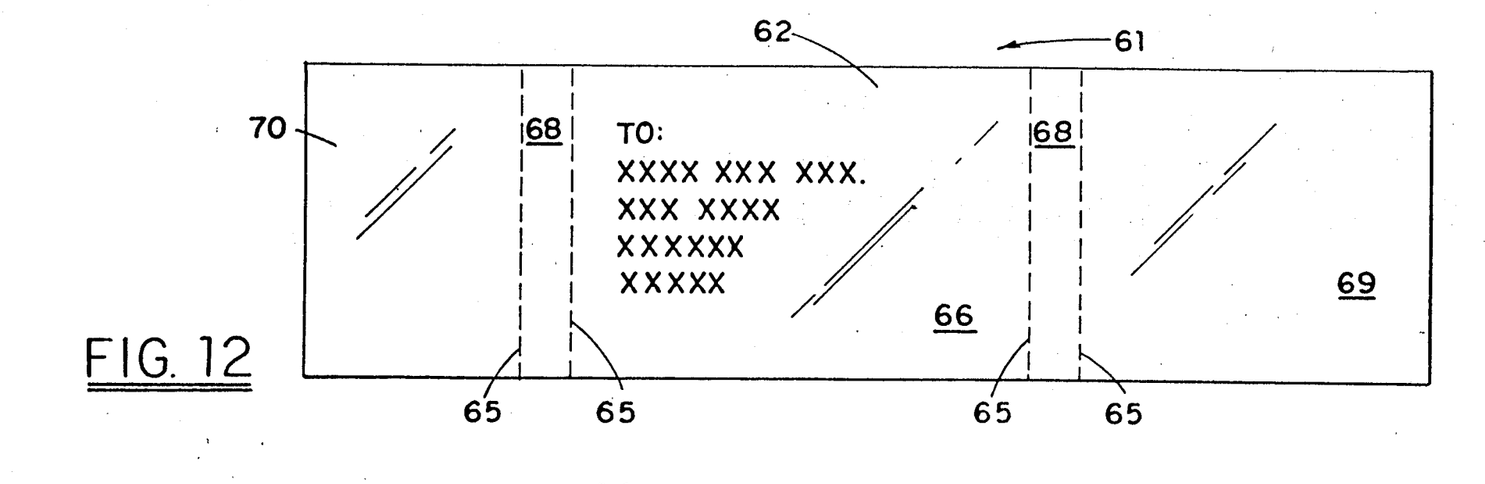
FIG. 12 is a top plan view of a mailing label design to be secured to and placed around the container of FIG. 1.
Figure 13:
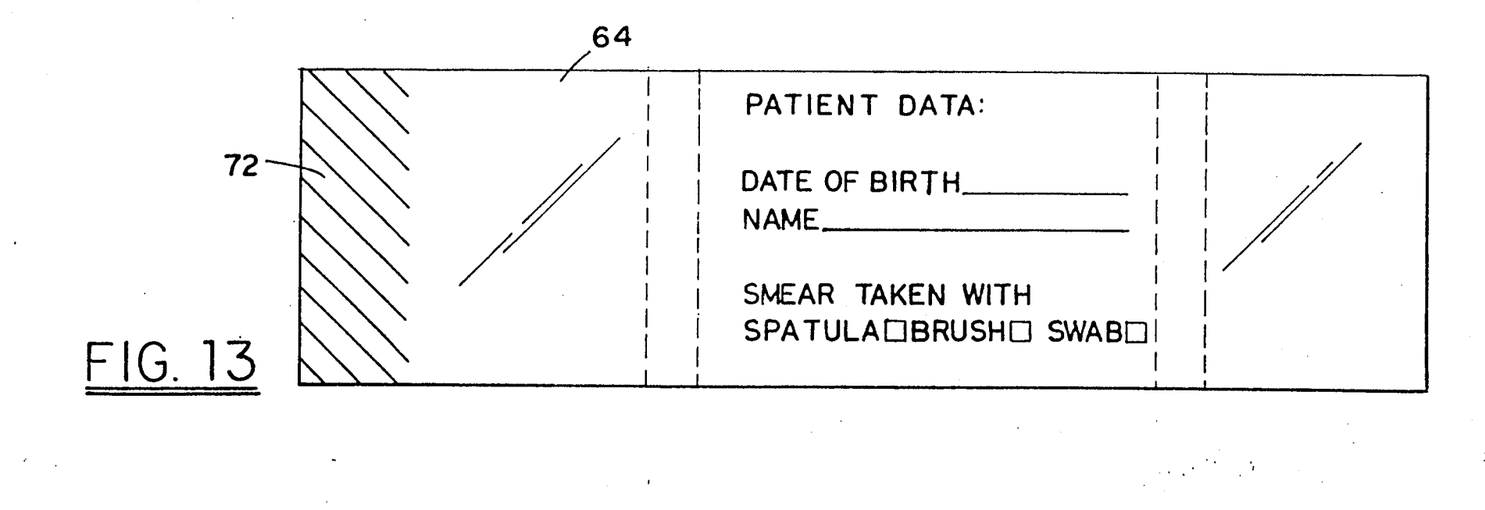
FIG. 13 is a back plan view of the label of FIG. 12.
Figure 14:
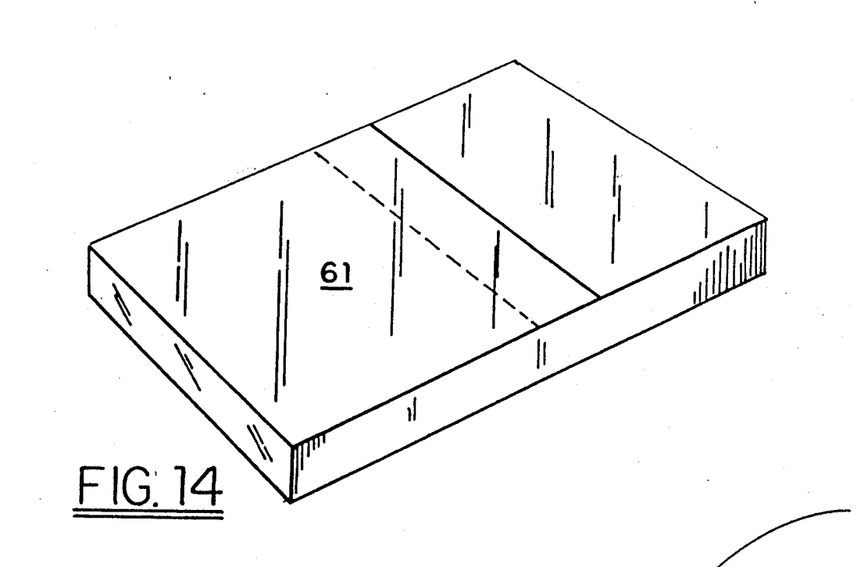
FIG. 14 is a perspective view of the container of FIG. 1 and label of FIGS. 12 & 13 secured thereto.
Figure 15:
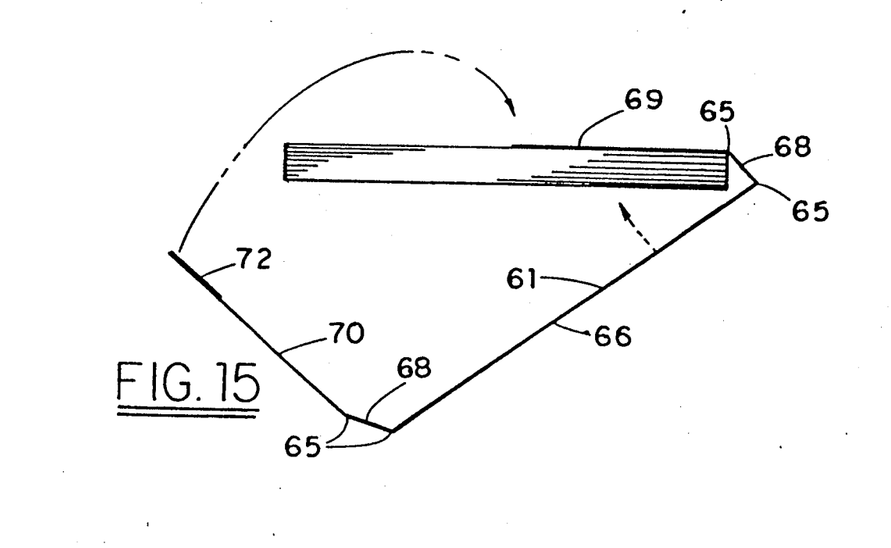
FIG. 15 is a side elevational view of the container of FIG. 14 with the label partially folded.
Figure 16:
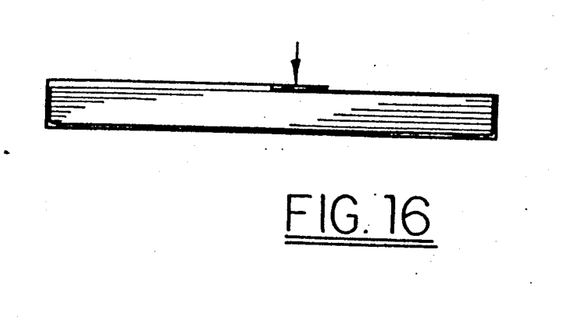
FIG. 16 is a side elevational view of the container of FIG. 15 with the mailing label fully folded.
Figure 17:
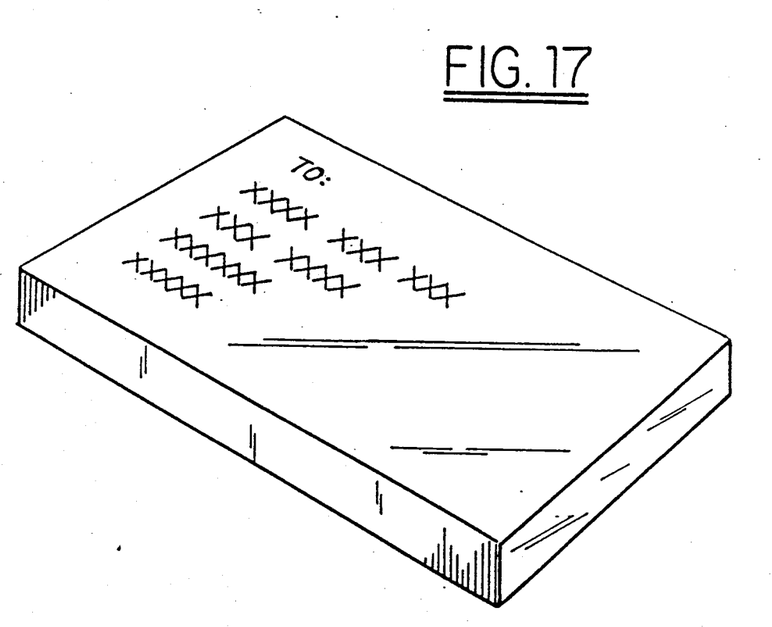
FIG. 17 is a top perspective view of the container and mailing label assembly made in accordance with the present invention.

After the appropriate biological sample has been placed on slide 40, the cover 14 is then slid along the base portion 12 to its closed position as illustrated in FIG. 2. Thereafter, a mailing label as illustrated in FIGS. 12 and 13 is wrapped about the cover, such as illustrated in FIGS. 14 and 15. The mailing label 61 is provided with a front and back side 62, 64. The mailing label 61 is provided with a plurality of fold lines 64 which form a central portion 66, a pair of end portions 68, and a pair of back portions 69, 70 respectively. The central portion 66 is designed to have a mailing address placed thereon. The end portion 68 are designed to be placed adjacent to ends 18 of base 12, and the back portion 69, 70 are designed to be folded about the container on the side opposite central portion 66 as illustrated in FIGS. 14 and 15 and are overlapped. The longer back portion 69 is placed against container 10. The side of back portion 69 adjacent container 10 may be provided with adhesive surface for securing the label 61 to the container 10. The back portion 70 is folded over into back portion 69 and is secured thereto in any convenient manner. In the embodiment illustrated, this is accomplished by an adhesive placed on the backside of back portion 70 identified as area 72 in FIG. 13.

As illustrated in FIG. 13, the back side 64 may be provided with pertinent patient data and/or the specimen taken. In the particular embodiment illustrated, such information may comprise the patient's name, the date of the sample, the type of sample, and the manner in which the sample was taken. However, it is to be understood that any pertinent data desired may be provided thereon.

The container 10, slide 40, and mailing label 61 is designed to be provided to the physician in the form of a kit for various medical tests. For example, the container 10 will be initially provided with a slide 40 already placed in receiving well 16 and an appropriate mailing label 61 is secured to container 10. The physician, when he receives the kit, will have the slide already stored in a dust-free non-contaminating manner.

When the physician wishes to obtain a specimen, he takes the container and label assembly, and unfolds the label. The physician then slides the cover 14 to the first position as illustrated in FIG. 10. The physician then provides whatever appropriate information on the microscope slide as desired. For example, the type of test being conducted and perhaps a patient code. Thereafter, the cover 14 is slid to the second open position as illustrated in FIG. 11 and the biological sample is placed directly on the slide while still in the container 10. This eliminates the need for the physician to specifically handle the microscope slide in order to place the specimen thereon, thus, minimizing the potential of obtaining any grease from the hands of the physician onto the slide which may interfere with the test results. The placement of the slide at the small angle provided by ramps 44, assists in the placement of the specimen on the slide as opposed to placing a specimen on a normally flat slide placed on a normally flat surface. Additionally, the slanting of slide 40 is believed to assist in properly applying a fixative, typically, a polyethylene glycol mixture, to the specimen. The slant allows the fixative to coat the specimen retention area 45 and flow to the bottom, allowing any excess alcohol to quickly evaporate. Further, as is quite evident, the slide 40 can be easily manipulated within the container or package 10 to allow easy placement of the specimen thereon. The positive manner in which the cover 14 is held in the various stop positions, assists the user in placing the appropriate notation on the slide 40 and mailing label 61. Thereafter, the cover is then slid back into the closed position as illustrated in FIG. 2. The appropriate mailing information is placed on the backside of the mailing label as appropriate and then folded about the container 10 and sealed. The container is then sent to the lab by mail or appropriate courier.

It is to be understood that various changes or modifications may be made without departing from the scope of the present invention. For example, but not by way of limitation, a single container lug 30 may be provided in place of the pair of space lugs illustrated. The present invention being limited to the following claims.

What is claimed is:

1. A container for handling and transporting glass slides comprising:

a base support having at least one slide retention well having a pair of oppositely disposed sidewalls and a pair of oppositely disposed endwalls for receiving a single glass slide therein leaving only a small clearance between the slide and said sidewalls and said endwalls, the glass slide having a top surface having a specimen retention area;

a top cover for engagement with said base support and for substantially enclosing said glass slide within said base support, said top cover being slideably mounted to said base support and remaining secured thereto for movement in either direction along a single axis so as to allow access to a desired portion of the top surface of the glass slide placed within said one slide retention well;

means for positioning said glass slide placed in said at least one slide retention well at a small acute angle greater than 0° with respect to said cover so that the specimen retention area of the glass slide is spaced from said cover; and means for firmly holding in position the glass slide in said retention well when said top cover is in the closed position.

2. A container according to claim 1 wherein said top cover further includes means for limiting the amount said cover can slide.

3. A container according to claim 2 wherein said means for limiting the amount said cover can slide comprises at least one projection which extends from said cover toward said base support and engages the periphery of said base support.

4. A container according to claim 1 wherein said cover snap fits on said base support.

5. A container according to claim 1 wherein said cover is provided with means to assist in moving said cover.

6. A container according to claim 1 wherein said cover is further provided with means for locking said cover in the closed position.

7. A container according to claim 6 wherein said means for locking said cover in the closed position comprises at least one projection extending from said cover which engages the periphery of said base support.

8. A container according to claim 1 wherein said base support is provided with a plurality of slide retention wells.

9. A container according to claim 1 wherein said means for firmly holding and retaining in position said glass slide comprising at least one projection which extends toward said glass slide placed in said slide retention well, said projection being adjacent one end of said slide.

10. A container according to claim 1 wherein said small angle in the range of 0° to 6°.

11. A container according to claim 10 wherein said small angle is about 2°.

12. A kit for handling and transporting microscope slides comprising;
    at least one microscope slide for receiving and retaining a specimen thereon;
    a base support having at least one slide retention well having a pair of oppositely disposed sidewalls and a pair of oppositely disposed endwalls for receiving a single glass slide therein leaving only a small clearance between the slide and said sidewalls and said endwalls, the glass slide having a top surface specimen retention area;
    a top cover for engagement with said base support and for substantially enclosing said glass slide within said base support, said top cover being slideably mounted to said base support and remaining secured thereto for movement in either direction along a single axis so as to allow access to a desired portion of the top surface of the glass slide placed within said one retention well;
    means for positioning said glass slide placed in said at least one slide retention well at a small acute angle greater than 0° with respect to said cover so that the specimen retention area of the glass slide is spaced from said cover; and
    means for firmly holding in position the glass slide in said retention well when said top cover is in the closed position,
    an information mailing label for placement on said container.

13. A container for handling and transporting glass slides comprising;
    a base support having at least one slide retention well having a pair of oppositely disposed sidewalls and a pair of oppositely disposed endwalls for receiving a single glass slide therein leaving only a small clearance between the slide and said sidewalls and said endwalls, said base support having an outer peripheral wall, the glass slide having a top surface having a specimen retention area;
    a top cover slideably mounted to said base support and remaining secured thereto for substantially enclosing said glass slide within said base support; and
    means for slideably moving said top cover on said base support so for movement in either direction along a single axis so as to allow alternate access to different portions of a slide placed within said slide retention well;
    means for firmly holding in position the glass slide in said retention well when said top cover is in the closed position.

14. A container according to claim 13 wherein said top cover further includes means for limiting the amount said cover can slide.

15. A container according to claim 14 wherein said means for limiting the amount said cover can slide comprises at least one projection which extends from said cover toward said base support and engages the peripheral wall of said base support.

16. A container according to claim 13 wherein said cover snap fits on said base support.

17. A container according to claim 13 wherein said cover is provided with means to assist in moving said cover.

18. A container according to claim 13 wherein said cover is further provided with means for locking said cover in the closed position.

19. A container according to claim 18 wherein said means for locking said cover in the closed position comprises at least one projection extending from said cover which engages the peripheral wall of said base support.

20. A container according to claim 13 wherein said base support is provided with a plurality of slide retention wells.

21. A container according to claim 13 wherein said small angle in the range of 0° to 6°.

22. A container according to claim 21 wherein said small angle is about 2°.

23. A container according to claim 13 further comprising means for preventing the top of said slide from contacting said cover.

24. A container according to claim 23 wherein said means for preventing the top of said slide from contacting said cover comprising a projection extending from said cover toward said base adjacent one of said end walls, said one endwall wall having an opening for allowing said projection to pass there through.

25. A container according to claim 24 wherein said projection has an outer surface which is substantially flush with the outer surface of said peripheral wall when said cover is in the closed position.

26. A kit for handling and transporting microscope slides comprising;
    at least one microscope slide for receiving and retaining a specimen thereon; and
    a base support having at least one slide retention well having a pair of oppositely disposed sidewalls and a pair of oppositely disposed endwalls for receiving a single glass slide therein leaving only a small clearance between the slide and said sidewalls and said endwalls, said base support having an outer peripheral wall, the glass slide having a top surface having a specimen retention area;

a top cover slideably mounted to said base support and remaining secured thereto for substantially enclosing said glass slide within said base support; and means for slideably moving said top cover on said base support so for movement in either direction along a single axis so as to allow alternate access to different portions of a slide placed within said slide retention well;

means for firmly holding in position the glass slide in said retention well when said top cover is in the closed position.

27. A kit according to claim 26 wherein said information mailing label is capable of being placed around said container, and said mailing label further including a section for placement of an addressee on one side, and placement of patient information on the inside of said mailing label.

28. A container for handling and transporting glass slides comprising;

a base support having at least one slide retention well having a pair of oppositely disposed sidewalls and a pair of oppositely disposed endwalls for receiving a single glass slide therein leaving only a small clearance between the slide and said sidewalls and said endwalls, the glass slide having a top surface having a specimen retention area;

a top cover for slidable mounted to said base support for substantially enclosing the glass slide within said base support and remaining secured thereto for movement in either direction along a single axis in either direction so as to allow access to the desired portion of the top surface of the glass slide; and means for preventing the top of said slide from contacting the inside of the cover, said means for preventing the top of said slide from contacting said cover comprises a bar stop which extends from said cover across at least a portion of said slide.

29. A container according to claim 28 when said means for preventing the top of said slide from contacting said cover comprises a bar stop which extends from said cover across at least a portion of said slide.

30. A kit according to claim 12 wherein said information mailing label is capable of being placed around said container, and said mailing label further including a section for placement of an addressee on one side, and placement of patient information on the inside of said mailing label.

31. A container for handling and transporting glass slides comprising;

a base support having at least one slide retention well having a pair of oppositely disposed sidewalls and a pair of oppositely disposed endwalls for receiving a single glass slide having a top surface that is inserted therein leaving only a small clearance between the slide and said sidewalls and said endwalls;

a top cover slideably mounted to said base support and remaining secured thereto for movement in either direction along a single axis; and for substantially enclosing the glass within said base support means for moving said top cover on said base support so as to allow alternate access to different portions of the top surface of the slide placed within said slide retention well; and means for preventing the top surface of said slide from contacting the cover.

* * * * *